(12) United States Patent
Koch et al.

(10) Patent No.: US 6,787,591 B2
(45) Date of Patent: Sep. 7, 2004

(54) SYNERGISTIC STABILIZER COMPOSITIONS FOR THEMOPLASTIC POLYMERS IN PROLONGED CONTACT WITH WATER

(75) Inventors: Harald Koch, Burgheim (DE); Christoph Kröhnke, Breisach-Oberrimsingen (DE); Alexander Lichtblau, Augsburg (DE); Matthias Zäh, Gersthofen (DE)

(73) Assignee: Clariant Finance (BVI) Limited, Tortola (VG)

( * ) Notice: Subject to any disclaimer, the term of this patent is extended or adjusted under 35 U.S.C. 154(b) by 191 days.

(21) Appl. No.: 10/204,397

(22) PCT Filed: Feb. 21, 2001

(86) PCT No.: PCT/IB01/00245

§ 371 (c)(1),
(2), (4) Date: Aug. 22, 2002

(87) PCT Pub. No.: WO01/62840

PCT Pub. Date: Aug. 30, 2001

(65) Prior Publication Data

US 2003/0073768 A1 Apr. 17, 2003

(30) Foreign Application Priority Data

Feb. 25, 2000 (GB) .............................. 0004436

(51) Int. Cl.$^7$ ........................ C08K 5/34; C08K 5/3452; C08K 5/09; C08K 5/10; C08K 5/12
(52) U.S. Cl. ........................ 524/102; 524/91; 524/100; 524/108; 524/291; 524/342; 524/349; 524/359; 524/502; 524/612
(58) Field of Search ........................ 524/91, 100, 102, 524/108, 291, 342, 349, 359, 502, 612

(56) References Cited

U.S. PATENT DOCUMENTS

| | | | |
|---|---|---|---|
| 4,325,863 A | 4/1982 | Hinsken et al. | 524/109 |
| 4,338,244 A | 7/1982 | Hinsken et al. | 524/109 |
| 5,169,925 A | 12/1992 | Schmailzl et al. | 528/367 |
| 5,175,312 A | 12/1992 | Dubs et al. | 549/307 |
| 5,216,052 A | 6/1993 | Nesvadba et al. | 524/108 |
| 5,252,643 A | 10/1993 | Nesvadba | 524/111 |
| 5,254,608 A * | 10/1993 | McClure | 524/91 |
| 5,356,966 A | 10/1994 | Nesvadba | 524/111 |
| 5,367,008 A | 11/1994 | Nesvadba | 524/111 |
| 5,369,159 A | 11/1994 | Nesvadba | 524/111 |
| 5,428,162 A | 6/1995 | Nesvadba | 544/221 |
| 5,428,177 A | 6/1995 | Nesvadba | 549/304 |
| 5,633,378 A | 5/1997 | Gaa et al. | 546/16 |

FOREIGN PATENT DOCUMENTS

| | | |
|---|---|---|
| DE | 43 16 611 | 11/1993 |
| DE | 43 16 622 | 11/1993 |
| DE | 43 16 876 | 11/1993 |
| DE | 196 37 181 | 3/1997 |
| EP | 0 589 839 | 3/1994 |
| WO | WO 00/77084 | 12/2000 |
| WO | WO 01/07511 | 2/2001 |

OTHER PUBLICATIONS

English abstract for DE 19637181, Mar. 20, 1997.
XP–002171318, Chemical Abstract, "Indirect food additives: adjuvants, production aids, and sanitizers", Dec. 2, 1999.
Higuchi, et al., Gas Co., Ltd., "Relationship between molecular structure of polyethylene or resins or additive and long term performance of polyethylene pipes", Japan. Proc. International Gas Research Conference (1998), vol. 3, pp. 67–75.
Th. Schmutz, et al., "Advanced extraction resistant long-–term thermal stabilizers for polyolefin pipes", Journal of Elastomers and Plastics, vol. 30, Jan. 1998, pp. 55–67.
F. Gugumus, "Mechanisms of thermooxidates stabilisation with HAS", Polymer Degradation and Stability, 44, (1994) pp. 299–322.
H. Zweifel "Principals of Stabilization of Polymeric Materials", Springer, Berlin, Heidelberg, New York, 1998, pp. 71–75.

* cited by examiner

Primary Examiner—Kriellion A. Sanders
(74) Attorney, Agent, or Firm—Anthony A. Bisulca

(57) ABSTRACT

The invention relates to synergistic stabilizer compositions comprising Hindered Amine Stabilizers (HAS), phenolic antioxidants, and, if appropriate, UV-absorbers, for thermoplastic polymers, especially for polyolefin pipes and other polyolefin molding materials, which are in prolonged contact with water. These mixtures show superior long term performance as measured by standard test methods such as oxidation induction time (OIT).

13 Claims, No Drawings

SYNERGISTIC STABILIZER COMPOSITIONS FOR THEMOPLASTIC POLYMERS IN PROLONGED CONTACT WITH WATER

The invention relates to synergistic stabilizer compositions comprising Hindered Amine Stabilizers (HAS), phenolic antioxidants, and, if appropriate, UV-absorbers, for thermoplastic polymers, especially for polyolefin pipes and other polyolefin molding materials, which are in prolonged contact with water.

The usability and lifetime of thermoplastic polymers and especially—often partially crosslinked-polyolefin pipes, geotextiles and other molding materials which are in prolonged contact with water such as is influenced by numerous parameters such as mechanical properties, density, molar mass and mass distribution of the polymer. Depending on the final use and the specific conditions (temperature, stress, and environmental influences) during the use, a lifetime of up to several decades should be guaranteed. New trends for lifetime expectancy are more than 50 years. In case of their use for water transportation, special requirements must be fulfilled which can be reached by addition of appropriate stabilizers and stabilizer conditions. Their contribution can be determined under accelerated test conditions at elevated temperatures by hot water storage. As important technical criteria oxidation induction time (OIT) and mechanical stability are used to assess the stabilization of polyolefin pipes or other polyolefin-based molding materials. OIT-tests are still established and are used as technically important criteria despite the fact that extrapolations of OIT-data are discussed since a long time to be often too optimistic compared to conventional oven aging results. Effects in the polymer matrix e.g. change in cristallinity, free volume, morphology, and coefficient of diffusion and reaction kinetics cause changes in the degradation mechanism. Nevertheless, especially in the PE-MD- and PE-HD-sector OIT-limits of at least 30 minutes at T=210° C. are required.

Another technical criterion which must fulfill certain technical requirements is color determined as yellowness index (YI).

Further technical criteria to judge the quality of resins used for contacts with water is the remaining stabilizer content after hot water storage (95° C.) which is part of the standard test program of the involved resin producers and manufacturers of finished articles.

The following publications refer to the above mentioned problems:
1) Higuchi, Y.; Nishimura, H.; Tamamura, H.; Harada, T. Osaka Gas Co., Ltd., Japan. Proc. Int. Gas Res. Conf. (1998), (Vol. 3), 67–75.
2) Advanced extraction resistant long-term thermal stabilizers for polyolefin pipes. Schmutz, Th.; Kramer, E.; Zweifel, H.; Dörner, G. Ciba Specialty Chemicals, Inc., Basel, Switz. J. Elastomers Plast. (1998), 30(1), 55–67.

One of the decisive criteria preventing rapid oxidative degradation of thermoplastic polymers is the use of long-term stabilizers. Their efficiency is depending on the compatibility, the solubility, the mobility and the migration of additives in the pipe resin.

Superior long-term thermal stability of thermoplastic materials such as polyolefin pipes and other molding polyolefin materials can be achieved using sterically hindered phenols or piperidine-based sterically hindered amine stabilizers (HAS) (F. Gugumus, Polym. Degrad. Stab. 44, 299, (1994)). Also combination of both stabilizer types are used and are therefore basically state-of-the-art. Combinations of phenolic antioxidants with phosphite are described in H. Zweifel in "Stabilization of Polymeric Materials", Springer, Berlin, Heidelberg, New York, 1998, p. 71–75. DE-A-196 37 181 discloses stabilizing mixtures of phenolic antioxidants, sterically hindered amines and organic phosphites or phosphonites.

As already pointed out earlier there is a certain technical need to improve stabilizer systems used in polymer substrates for extended contact with extracting media with regard to long term stability of the system (problems with migration, stability to hydrolysis).

It has now been found that appropriate combinations of special phenol-based stabilizers with certain hindered amine stabilizers lead to superior long-term thermal stabilization in polyolefin pipes and generally in polyolefin-based moldings to be utilized under extractive conditions of water after hot water storage.

Also multiple combinations of the special phenol-component with conventional sterically hindered phenols and certain sterically hindered amines show superior effects. The instant stabilizer combinations offer surprisingly the possibility to outperform the state of the art.

Object of the instant invention are stabilizer compositions for thermoplastic polymers comprising
a) at least one sterically hindered amine, one of which must be the polymer of epichlorhydrin and 2,2,4,4-tetramethyl-7-oxa-3, 20-diaza-20-(2,3-epoxi-propyl)-dispiro-[5.1.11.2]-heneicosane-21-one (LS 1), the others being poly-{[6[1,1,3,3-tetramethylbutyl)-imino]-1,3,5-triazine-2,4-diyl][2-(2,2,6,6-tetramethylpiperidyl)-amino]-hexamethylene-[4-(2,2,6,6-tetramethylpiperidyl)-imino]} (LS 2) or poly-(N-hydroxyethyl-2,2,6,6-tetramethyl-4-hydroxy-piperidyl-succinate) (LS 3), and
b) at least one phenolic antioxidant,
wherein the overall weight ratio of component(s) a) to the overall weight ratio of component(s) b) is from 10:1 to 1:5.

Preferred are stabilizer compositions wherein component b) is selected from the compounds (AO 1) to (AO 8),
bis-[3,3-bis-(4'-hydroxy-3'-tert.butylphenyl)-butanoic acid]-glycolester (AO 1),
tetrakismethylene(3,5-di-tert.butyl-4-hydroxyphenyl)-hydrocinnamate (AO 2), octadecyl-3-(3,5-di-tert.butyl-4-hydroxyphenyl)-propionate (AO 3), 4,4',4"-[(2,4,6-trimethyl-1,3,5-benzenetriyl)tris(methylene)]-tris[2,6-bis(1,1-dimethylethyl)-phenol] (AO 4),
1,3,5-triazine-2,4,6(1H,3H,5H)-trione, 1,3,5-tris[[4-(1,1-dimethylethyl)-3-hydroxy-2,6-dimethylphenyl]methyl] (AO 5),
phenol, 4,4',4"-(1-methyl-1-propanyl-3-ylidene)tris[2-(1,1-dimethylethyl)-5-methyl (AO 6), phenol, 2,6-bis[[3-(1,1-dimethylethyl)-2-hydroxy-5-methylphenyl]octahydro-4,7-methano-1H-indenyl]-4-methyl (AO 7), or
benzenepropanoic acid, 3-(1,1-dimethylethyl)-4-hydroxy-5-methyl-, 2,4,8,10-tetraoxa-spiro[5.5]undecane-3,9-diylbis(2,2-dimethyl-2,1-ethanediyl)ester (AO 8).

Preferred are also stabilizer compositions wherein component b) is compound (AO 1), (AO 2) or (AO 3) or any mixture thereof, especially preferred are compositions wherein component b) is a mixture of compound (AO 1) and (AO 2) in a weight ratio of 5:1 to 1:5, more preferably of 2:1 to 1:2.

Very good stabilizing properties are also achieved with stabilizer compositions wherein an additional UV-absorber as further component c) is
methanone, [2-hydroxy-4-(octyloxy)phenyl]phenyl (UV 1) or phenol, 2-(5-chloro-2H-benzotriazol-2-yl)-6-(1,1-dimethylethyl)-4-methyl (UV 2) or a 2-hydroxybenzophenone, a 2-(2-hydroxyphenyl)-benzotriazole, a 2-(2-hydroxyphenyl)-1,3,5-benzotriazine, an oxanilide, a cinnamate or a salicylate, and wherein the weight ratio of component(s) a): component(s) b): component(s) c) is from 5:1:1 to 1:5:5.

The compounds (LS 1) to (LS 3), (AO 1) to (AO 8), (UV 1) and (UV 2) are commercially available products of the following chemical structure, as far as known:

Compound (LS 2):

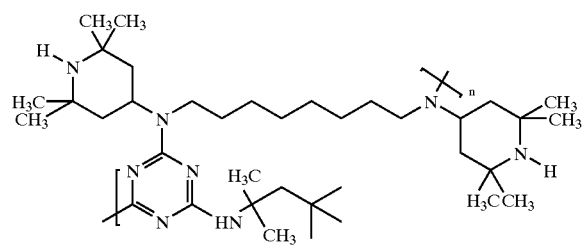

Compound (LS 3):

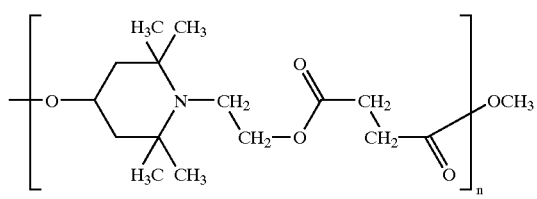

Compound (UV 1):

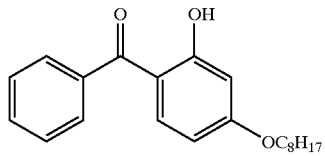

Compound (UV 2):

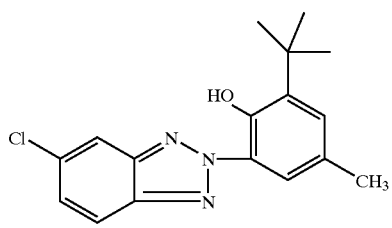

Compound (AO 1):

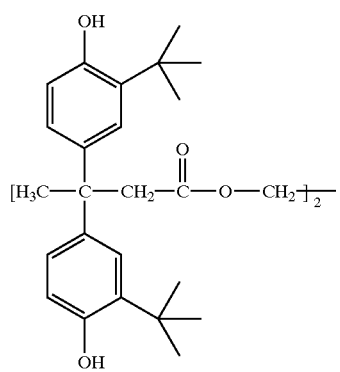

Compound (AO 2):

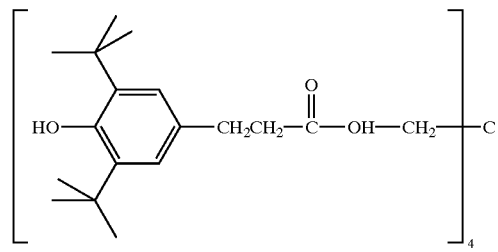

Compound (AO 3):

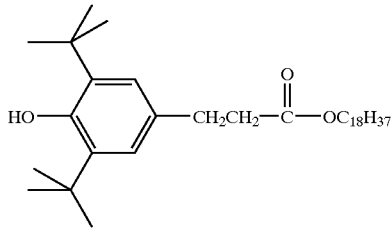

Compound (AO 4):

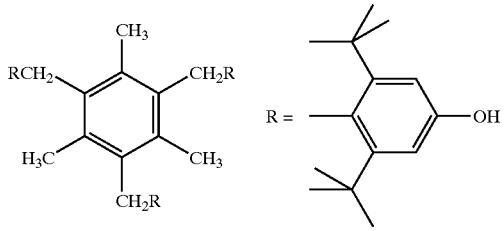

Compound (AO 5):

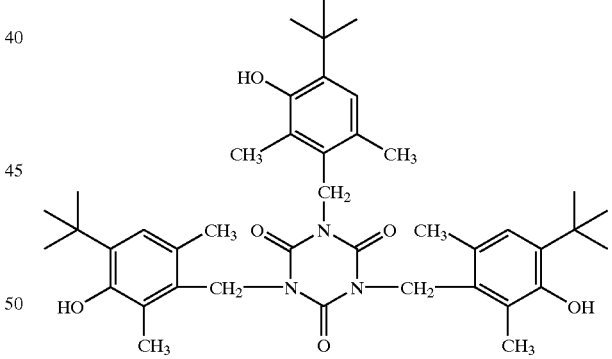

Compound (AO 6):

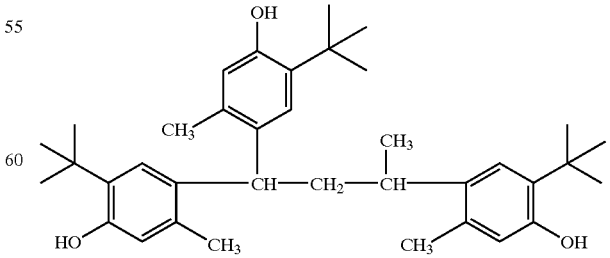

Compound (AO 7):

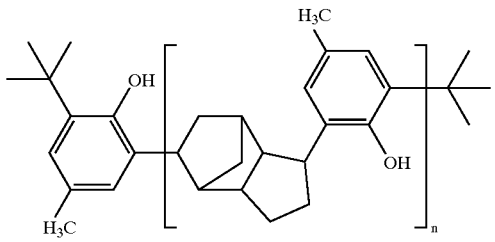

Compound (AO 8):

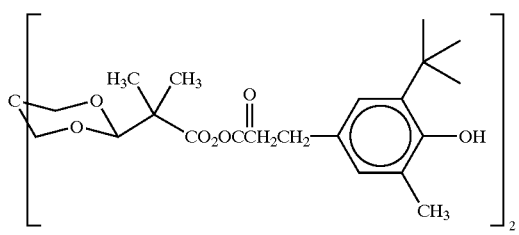

A further object of the instant invention is a method of use of said stabilizer compositions for the stabilization of thermoplastic polymers, especially polyolefins, which are in prolonged contact with extracting media like water, in concentrations of 0.001% to 2.000%, preferably 0.020% to 0.20% by weight, based on the polymer.

Another object of the instant invention is a process of stabilizing thermoplastic polymers, especially polyolefins, which are in prolonged contact with extracting media like water, by incorporating 0.001% to 2.000%, preferably 0.020% to 0.20% by weight, based on the polymer, of said stabilizer compositions.

Suitable thermoplastic polymers to be stabilized according to the instant invention are for example the following ones:

1. Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked); for example, high density polyethylene (HDPE), polyethylene of high density and high molar mass (HDPE-HMW), polyethylene of high density and ultrahigh molar mass (HDPE-UHMW), medium density polyethylene (HMDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by various, and especially by the following, methods:

a) free-radical polymerization (normally under high pressure and at elevated temperature)
   b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polyethylene with polyisobutylene, polypropylene with polyethylene (for example PP/HDPE/LDPE) and mixtures of different types of polyethylene (for example LDPE/HDPE) with one another.

3. Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

4. Hydrocarbon resins (for example $C_5$–$C_9$) including hydrogenated modifications thereof (e.g. tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methacrylate; mixtures of high impact strength of styrene copolymers and another polymer, for example a polyacrylate, a diene polymer or an ethylene-propylene-diene terpolymer; and block copolymers of styrene, such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene;

styrene and maleimide on polybutadiene; styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example the copolymer mixtures known as ABS, MBS, ASA or AES polymers.

8. Halogen-containing polymers, such as polychloroprene, chlorinated rubber, chlorinated and brominated copolymer of isobutylene-isoprene (halobutyl ruuber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, polyacrylonitriles, polyacrylamides and polymethyl methacrylates impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homopolymers and copolymers of cyclic ethers, such as polyalkylene glycols, polyethylene oxide, polypropylene oxide or copolymers thereof with bisglycidyl ethers.

13. Polyacetals such as polyoxymethylene and those polyoxymethylenes which contain comonomers, for example ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from hydroxyl-terminated polyethers, polyesters and polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

17. Polyureas, polyimides, polyamide-imides, polyether imides, polyester amides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylic resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, examples being products of bisphenol A diglycidyl ethers, bisphenol F diglycidyl ethers, which are crosslinked by means of customary hardeners, such as anhydrides or amines, for example, with or without accelerators.

27. Natural polymers such as cellulose, natural rubber, gelatin and derivatives thereof which have been chemically modified in a polymer-homologous manner, for example cellulose acetates, cellulose propionates and cellulose butyrates, or the cellulose ethers such as methyl cellulose; as well as rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/MBS, PPO/HIPS, PPO/PA 6.6 and copolymers, PA/HDPE, PA/PP, PA/PPO, PBT/ABS or PBT/PET/PC.

29. Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

30. Aqueous emulsions of natural or synthetic rubbers, such as natural rubber latex or latices of carboxylated styrene-butadiene copolymers.

The stabilizer compositions of the instant invention or the thermoplastic polymers to be stabilized may if desired also comprise further additives, examples being antioxidants, light stabilizers, metal deactivators, antistatic agents, flame retardants, lubricants, nucleating agents, acid scavengers (basic costabilizers), pigments and fillers. Examples of suitable additives which can additionally be employed in combination are compounds as set out below:

1. Antioxidants 1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or sidechain-branched nonylphenols, such as 2,6-di-nonyl-4-methylphenol, 2,4-dimethyl-6-(1-methylundec-1'-yl)-phenol, 2,4-dimethyl-6-(1'-methylheptadec-1'-yl)-phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.5 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl) butane, 2,2-bis(3,5-di-tert-butyl-4-hydroxyphenyl) propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane, ethylene glycol bis[3,3-bis(3'-tert-butyl-4'-hydroxyphenyl)butyrate].

1.6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate, tridecyl 4-hydroxy-3,5-di-tert-butylbenzylmercaptoacetate.

1.7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

1.8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurat, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.10. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the Ca salt of the monoethyl ester of 3,5-di-tert-butyl-4-hydroxybenzylphosphonic acid.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl-4-hydroxyphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxalamide, 3-thiaundecanol, 3thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenylacetic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Esters of 3,3-bis(3'tert-butyl-4'-hydroxyphenyl)butyric acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.17. Amides of β-(3,5-di-tert-butyl-4-hydroxyphenyl) propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Tocopherol, such as α-tocopherol, β-tocopherol, γ-tocopherol, δ-tocopherol and mixtures thereof (vitamin E).

1.19. Ascorbic acid (vitamin C).

1.20. Amine antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(naphthyl-2-)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(-toluenesulfonamido) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di-[(2-methylphenyl)amino]ethane, 1,2-di-(phenylamino)propane, (o-tolyl)biguanide, di[4-(1',3'-dimethylbutyl)-phenyl]amine, tert-octylated N-phenyl-1-naphthylamine, mixture of mono- and dialkylated tert-butyl/tert-octyldiphenylamines, mixture of mono- and dialkylated nonyidiphenylamines, mixture of mono- and dialkylated dodecyidiphenylamines, mixture of mono- and dialkylated isopropyl/isohexyl-diphenylamines, mixture of mono- and dialkylated tert-butyldiphenylamines, 2,3-dihydro-3,3-dimethyl-4H-1,4-benzothiazine, phenothiazine, mixture of mono- and dialkylated tert-butyl/tert-octyl-phenothiazines, mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl) sebacate, 2,2,6,6-tetramethylpiperidin-4-one, 2,2,6,6-tetramethylpiperidin-4-ol.

2. UV Absorbers and Light Stabilizers 2.1 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert.-butyl-5'-(2-methoxycarbonylethyl)-2'-hydroxyphenyl]benzotriazole with polyethylene glycol 300; [R—$CH_2CH_2$—$COO(CH_2)_3$]$_2$ where R=3'-tert-butyl-4'-hydroxy-5'-2H-benzotriazol-2-yl-phenyl.

2.2 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3 Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.5 Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example bis(2,2,6,6-tetramethylpiperidin-4-yl) sebacate, bis(2,2,6,6-tetramethylpiperidin-4-yl) glutarate, bis(2,2,6,6-tetramethylpiperidin-4-yl) succinate, bis(1,2,2,6,6-pentamethylpiperidin-4-yl) sebacate, bis(1,2,2,6,6pentamethylpiperidin-4-yl) glutarate, 2,2,6,6-tetramethylpiperidyl behenate, 1,2,2,6,6-pentamethylpiperidyl behenate, the condensate of 1-hydroxyethyl-2,2,6,6-tetramethyl-4-hydroxypiperidine and succinic acid, the condensate of N,N'-bis-(2,2,6,6-tetramethyl-4-piperidyl)hexamethylendiamine and 4-tert-octylamino-2,6-dichloro-1,3,5-s-triazine, tris-(2,2,6,6-tetramethyl-4-piperidyl) nitrilotriacetate, tetrakis(2,2,6,6-tetramethyl-4-piperidyl) 1,2,3,4-butantetraoate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, 4-stearoyloxy-2,2,6,6-tetramethylpiperidine, 4-stearyloxy-1,2,2,6,6-pentamethylpiperidine, 4-stearoyloxy-1,2,2,6,6-pentamethylpiperidine, bis(1,2,2,6,6-pentamethylpiperidyl) 2-n-butyl-2-(2-hydroxy-3,5-di-tert-butylbenzyl)malonate, bis(1,2,2,6,6-pentamethylpiperidyl) 2-n-butyl-2-(4-hydroxy-3,5-di-tert-butylbenzyl)malonate, 3-n-octyl-7,7,9,9-tetramethyl-1,3,8-triazaspiro[4.5] decane-2,4-dione, bis(1-octyloxy-2,2,6,6-tetramethylpiperidyl) sebacate, bis-(1-octyloxy-2,2,6,6-tetramethylpiperidyl) succinate, the condensate of N,N'-bis(2,2,6,6-tetramethyl-4piperidyl) hexamethylenediamine and 4-morpholino-2,6-dichloro-1,3,5-triazine, the condensate of N,N'-bis(2,2,6,6-tetramethyl-4-piperidyl)hexamethylenediamine and 4-cyclohexylamino-2,6-dichloro-1,3,5-triazine, the condensate of 2-chloro-4,6-di-(4-n-butylamino-2,2,6,6-tetramethylpiperidyl)-1,3,5-triazine and 1,2-bis-(3-aminopropylamino)ethane, the condensate of 2-chloro-4,6-di-(4-methoxypropylamino-2,2,6,6-tetramethylpiperidyl)-1,3,5-triazine and 1,2-bis-(3-aminopropylamino)ethane, the condensate of 2-chloro-4,6-di-(4-methoxypropylamino-1,2,2,6,6-pentamethylpiperidyl)-1,3,5-triazine and 1,2-bis-(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)-ethane, reaction products of 2-chloro-4,6-di-(4-n-butylamino-2,2,6,6-tetramethylpiperidyl)-1,3,5-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropylamino)ethane, reaction products of 2-chloro-4,6-di-(4-n-butylamino-1,2,2,6,6-pentamethylpiperidyl)-1,3,5-triazine with mono- or polyfunctional amines, where between one and all the active hydrogen atoms on the amine are replaced, such as with ethylenediamine, diethylenetriamin, hexamethylenediamine, 1,2-bis(3-aminopropylamino) ethane, reaction products of 2-chloro-4,6-di-(4-n-butylamino-2,2,6,6-tetramethylpiperidyl)-1,3,5-triazine and 4-tert-octylamino-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis(3-aminopropylamino)ethane, reaction products of 2-chloro-4,6-di-(4-n-butylamino-1,2,2,6,6-pentamethylpiperidyl)-1,3,5-triazine and 4-tert-octylamino-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropyl-amino) ethane, reaction products of 2-chloro-4,6-di-(4-n-butylamino-2,2,6,6-tetramethylpiperidyl)-1,3,5-triazine and 4-(4-n-butylamino-2,2,6,6-tetramethylpiperidyl)-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropylamino)ethane, reaction products of 2-chloro-4,6-di-(4-n-butylamino-1,2,2,6,6-pentamethylpiperidyl)-1,3,5-triazine and 4-(4-n-butylamino-2,2,6,6-tetramethylpiperidyl)-2,6-dichloro-1,3,5-s-triazine with mono- or polyfunctional amines, where between one and all the active hydrogen atoms on the amine are replaced, such as with ethylenediamine, diethylenetriamine, triethylenetetramine, hexamethylenediamine, 1,2-bis-(3-aminopropylamino)ethane, the condensate of 1,2-bis(3-aminopropylamino)ethane and 2,4,6-trichloro-1,3,5-triazine and also 4-butylamino-2,2,6,6-tetramethylpiperidine, N-(2,2,6,6-tetramethyl-4-piperidyl)-n-dodecylsuccinimide, N-(1,2,2,6,6-pentamethyl-4-piperidyl)-n-dodecylsuccinimide, 8-acetyl-3-dodecyl-7,7,9,9-tetramethyl-1,3,8-triazaspiro[4.5]decane-2,4-dione, oligomerized 2,2,4,4-tetramethyl-20-(oxiranylmethyl)-7-oxa-3,20-diaza-dispiro[5.1.11.2]heneicosan-21-one, oligomerized 1,2,2,4,4-pentamethyl-20-(oxiranylmethyl)-7-oxa-3,20-diazadispiro[5.1.11.2]heneicosan-21-one, oligomerized 1-acetyl-2,2,4,4-tetramethyl-20-(oxiranylmethyl)-7-oxa-3,20-diazadispiro[5.1.11.2]heneicosan-21-one, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, 2,2,4,4-tetramethyl-7-oxa-3,20-diazadispiro-[5.1.11.2]heneicosan-2 1-one, 2,2,4,4-tetramethyl-7-oxa-21-oxo-3,20-diazadispiro-[5.1.11.2] heneicosane-3-propanoic acid dodecyl ester, 2,2,4,4-tetramethyl-7-oxa-21-oxo-3,20-diazadispiro-[5.1.11.2] heneicosane-3-propanoic acid tetradecyl ester, 2,2,3,4,4-pentamethyl-7-oxa-3,20-diazadispiro-[5.1.11.2] heneicosan-21-one, 2,2,3,4,4-pentamethyl-7-oxa-21-oxo-3,20-diaza-dispiro-[5.1.11.2]heneicosane-3-propanoic acid dodecyl ester, 2,2,3,4,4-pentamethyl-7-oxa-21-oxo-3,20-diazadispiro-[5.1.11.2]-heneicosane-3-propanoic acid tetradecyl ester, 3-acetyl-2,2,4,4-tetramethyl-7-oxa-3,20-diazadispiro-[5.1.11.2]heneicosane-21-one, 3-acetyl-2,2,4,4-tetramethyl-7-oxa-21-oxo-3,20-diaza-dispiro-[5.1.11.2]heneicosane-3-propanoic acid dodecyl ester, 3-acetyl-2,2,4,4-tetramethyl-7-oxa-21-oxo-3,20-diazadispiro-[5.1.11.2]heneicosane-3-propanoic acid tetradecyl ester, 1,1',3,3',5,5'-hexahydro-2,2',4,4',6,6'-hexaaza-2,2',6,6'-bismethano-7,8-dioxo-4,4'-bis(1,2,2,6,6-pentamethyl-4-piperidyl)biphenyl, poly-N,N'-bis-(2,2,6,6-tetramethyl-4-piperidyl)-1,8-diazadecylene, adduct of 2,2,6,6-tetramethyl-4-allyloxypiperidine and polymethylhydridosiloxane (molar mass up to 4000), adduct of 1,2,2,6,6-pentamethyl-4-allyloxypiperidine and polymethylhydridosiloxane (molar mass up to 4000), N,N'-diformyl-N,N'-bis(2,2,6,6-tetramethyl-4-piperidinyl)-hexamethylenediamine, N,N'-diformyl-N,N'-bis(1,2,2,6,6-pentamethyl-4-piperidinyl)hexamethylenediamine, 5,11-bis-(2,2,6,6-tetramethyl-4-piperidinyl)-3,5,7,9,11,13-hexaazatetra-cyclo[7.4.0.0$^{2,7}$0.1$^{3,13}$]tetradecane-8,14-dione, 5,11-bis(1,2,2,6,6-pentamethyl-4-piperidinyl)-3,5,7,9,11,13-hexaazatetra-cyclo[7.4.0.0$^{2,7}$0.1$^{3,13}$]tetradecane-8,14-dione, [(4-methoxyphenyl)methylene]-propanedioic acid bis(2,2,6,6-tetramethyl-4-piperidinyl) ester, [(4-methoxyphenyl)-methylene]propanedioic acid bis-(1,2,2,6,6-pentamethyl-4-piperidinyl) ester, 2,4,6-tris (N-cyclohexyl-N-[2-(3,3,4,5,5-pentamethylpiperazinon-1-yl)ethyl]amino)-1,3,5-triazine, copolymer of styrene with methylstyrene and maleic anhydride reacted with 4-amino-2,2,6,6-tetramethylpiperidine and octadecylamine, copolymer of styrene with α-methylstyrene and maleic anhydride reacted with 4-amino-1,2,2,6,6-pentamethylpiperidine and octadecylamine, polycarbonate with 2,2'-[(2,2,6,6-tetramethyl-4-piperidinyl)imino]bis[ethanol] as diol component, polycarbonate comprising 2,2'-(1,2,2,6,6-pentamethyl-4-piperidinyl)imino]bis[ethanol] as diol component, copolymer of maleic anhydride and an α-olefin up to $C_{30}$ reacted with 4-amino-2,2,6,6-tetramethylpiperidine, copolymer of maleic anhydride and an α-olefin up to $C_{30}$ reacted with 1-acetyl-4-amino-2,2,6,6-tetramethylpiperidine, copolymer of maleic anhydride and an α-olefin up to $C_{30}$ reacted with 4-amino-1,2,2,6,6-pentamethylpiperidine, and also the N-alkyl- and N-aryl-oxy derivatives of the abovementioned compounds with free NH groups on the piperidine, especially α-methylbenzyloxy and alkyloxy from $C_1$ to $C_{18}$.

2.7 Oxalamides, for example 4,4'-dioctyloxyoxanilide, 2,2'-diethoxyanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy-disubstituted and of o- and p-ethoxy-disubstituted oxanilides.

2.8 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4',6-bis(2',4'-dimethylphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[4-dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine.

3. Metal deactivators, for example, N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite, tris(2-tert-butyl-4-thio(2'-methyl-4'-hydroxy-5'-tert-butyl)phenyl-5-methyl) phenyl phosphite, 2,2',2"-nitrilo[triethyl tris(3,3',5,5'-tetra-tert-butyl-1,1'-biphenyl-2,2'-diyl) phosphite], bis[2-methyl-4,6-bis(1,1-dimethylethyl)phenol]phosphorous acid ethyl ester.

5. Hydroxylamines, examples being N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamines prepared from hydrogenated tallow fatty amine.

6. Nitrones, examples being N-benzyl alpha-phenyl nitrone, N-ethyl alpha-methyl nitrone, N-octyl alpha-heptyl nitrone, N-lauryl alpha-undecyl nitrone, N-tetradecyl alpha-tridecyl nitrone, N-hexadecyl alpha-pentadecyl nitrone, N-octadecyl alpha-heptadecyl nitrone, N-hexadecyl alpha-heptadecyl nitrone, N-octadecyl alpha-pentadecyl nitrone, N-heptadecyl alpha-heptadecyl nitrone, N-octadecyl alpha-hexadecyl nitrone, nitrones derived from N,N-dialkylhydroxylamines prepared from hydrogenated tallow fatty amines.

7. Zeolites and hydrotalcites, such as ®DHT 4A. Hydrotalcites of this kind can be described by the formula

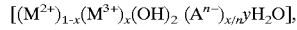

where
($M^{2+}$) is Mg, Ca, Sr, Ba, Zn, Pb, Sn, Ni
($M^{3+}$) is Al, B, Bi
$A^n$ is an anion of valency n
n is an integer from 1–4
x is a value between 0 and 0.5
y is a value between 0 and 2
A is $OH^-$, $Cl^-$, $Br^-$, $I^-$, $ClO_4^-$, $CH_3COO^-$, $C_6H_5COO^-$, $CO_3^{2-}$, $SO_4^{2-}$, $(OOC-COO)^{2-}$, $(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$, $BO_3^{3-}$, $PO_3^{3-}$, $HPO_4^{2-}$.

Preference is given to employing hydrotalcites in which ($M^{2+}$) is ($Ca^{2+}$), ($Mg^{2+}$) or a mixture of ($Mg^{2+}$) and ($Zn^{2+}$); ($A^{n-}$) is $CO_3^{2-}$, $BO_3^{3-}$, $PO_3^{3-}$; x has a value from 0 to 0.5 and y has a value from 0 to 2. It is also possible to employ hydrotalcites that can be described with the formula $[(M^{2+})_x(Al^{3+})_2 (OH)_{2x+6nz}(A_{n-})_{2y}H_2O]$.

Here, ($M^{2+}$) is $Mg^{2+}$, $Zn^{2+}$, but more preferably $Mg^{2+}$. ($A^{n-}$) is an anion, in particular from the group consisting of $CO_3^{2-}$, $(OOC-COO)^{2-}$, $OH^-$ and $S^{2-}$, where n describes the valency of the ion. y is a positive number, more preferably between 0 and 5, especially between 0.5 and 5. x and z have positive values, which in the case of x are preferably between 2 and 6 and in the case of z should be less than 2. The hydrotalcites of the following formulae are to be regarded with particular preference:

$Al_2O_3 \times 6MgO \times CO_2 \times 12H_2O$,
$Mg_{4.5}Al_2(OH)_{13} \times CO_3 \times 3.5H_2O$,
$4MgO \times Al_2O_3 \times CO_2 \times 9H_2O$,
$4MgO \times Al_2O_3 \times CO_2 \times 6H_2O$,
$ZnO \times 3MgO \times Al_2O_3 \times CO_2 \times 8-9H_2O$,
$ZnO \times 3MgO \times Al_2O_3 \times CO_2 \times 5-6H_2O$,
$Mg_{4.5}Al_2(OH)_{13} \times CO_3$.

Hydrotalcites are employed in the polymer preferably in a concentration of from 0.01 to 5% by weight, in particular from 0.2 to 3% by weight, based on the overall polymer formulation.

8. Thiosynergists, examples being dilauryl thiodipropionate and distearyl thiodipropionate.

9. Peroxide scavengers, examples being esters of β-thiodipropionic acid, for example the lauryl, stearyl, myristyl or tridecyl ester, mecaptobenzimidazole, the zinc salt of 2-mercaptobenzimidazole, zinc alkyldithiocarbamates, zinc dibutyldithiocarbamate, dioctadecyl monosulfide, dioctadecyl disulfide, pentaerythritol tetrakis(β-dodecylmercapto)propionate.

10. Polyamide stabilizers, examples being copper salts in combination with iodides and/or phosphorus compounds and salts of divalent manganese.

11. Basic costabilizers, examples being melamin, polyvinylpyrrolidone, dicyandiamide, triallyl cyanurate, urea derivatives, hydrazine derivatives, amines, polyamines, polyurethanes, alkali metal and alkaline earth metal salts of higher fatty acids, for example Ca stearate, Zn stearate, Mg behenate, Mg stearate, Na ricinoleate, K palmitate, antimony pyrocatecholate or tin pyrocatecholate, alkali metal and alkaline earth metal salts and also the zinc salt or the aluminum salt of lactic acid.

12. Nucleating agents, such as inorganic substances, examples being talc, metal oxides, such as titanium oxide or magnesium oxide, phosphates, carbonates or sulfates of, preferably, alkaline earth metals, organic compounds, such as mono- or polycarboxylic acids and also their salts, examples being 4-tert-butylbenzoic acid, adipic acid; diphenylacetic acid; sodium succinate or sodium benzoate; acetals of aromatic aldehydes and polyfunctional alcohols such as sorbitol, for example, such as 1,3–2,4-di(benzylidene)-D-sorbitol, 1,3–2,4-di(4-tolylidene)-D-sorbitol, 1,3–2,4-di(4-ethylbenzylidene)-D-sorbitol, polymeric compounds, such as ionic copolymers (ionomers), for example.

13. Fillers and reinforcing agents, examples being calcium carbonate, silicates, glass fibers, asbestos, talc, kaolin, mica, barium sulfate, metal oxides and metal hydroxides, carbon black, graphite, wood flour and other flours or fibers of other natural products, synthetic fibers.

14. Other additives, examples being plasticizers, lubricants, emulsifiers, pigments, rheological additives, catalysts, leveling assistants, optical brighteners, flameproofing agents, antistatics, blowing agents.

15. Benzofuranones and indolines, as described for example in U.S. Pat. Nos. 4,325,863, 4,338,244, 5,175,312; 5,216,052; 5,252,643, DE-A-4316611, DE-A-4316622, DE-A-4316876, EP-A-0589839 or EP-A-0591102, or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuranon-2-one, 3,3'-bis[5,7-di-tert-butyl-3-(4-[2-hydroxyethoxy]phenyl)-benzofuran-2-one, 5,7-di-tert-butyl-3-(4-ethoxyphenyl)-benzofuran-2-one, 3-(4-acetoxy-3,5-dimethylphenyl)-5,7-di-tert-butylbenzofuran-2-one, 3-(3,5-diethyl-4-pivaloyloxyphenyl)-5,7-di-tert-butylbenzofuran-2-one.

If employed in polyolefin-articles which are used under water extractive conditions after or in connection with hot water storage those mixtures show superior long term performance as measured by standard test methods such as oxidation induction time (OIT). The polyolefin resin can be applied also as coated or laminated layer on metal articles such as steel-pipes or sea-cables.

The described stabilizer systems used to stabilize polyolefin-articles which are exposed to water-extracting conditions especially during or after hot water treatment are able to prevent an early consumption by migration out of the polymer resin. This behavior improves clearly the long term stability of the referred articles.

Under the consideration of the state-of-the-art for stabilizing polyolefin-articles which are exposed to water extracting conditions such a clear improvement and contribution of particular stabilizers was not expected.

The following examples illustrate the invention.

EXAMPLES

Preparation and Testing of Samples

In the following examples "part" and "%" mean "parts by weight" and "% by weight".

Preparation of Powdered Mixtures of polyethylene-HD with Stabilizers

In a flask 100 parts of the polyethylene-HD (type PE-HD CRP 100, unpigmented, bimodal molecular weight distribution, producer: Elenac GmbH, Frankfurt) have been mixed with the base stabilizer composition consisting of 0.1 part Ca-stearate, 0.1 part of tris(2,4-di-tert.butylphenyl) phosphite and 0.1 part of a phenolic component (either AO 1 or AO 2 or a 1:1 mixture out of these phenols) Further added are 0.2 part or 0.3 part of lightstabilizers or lightstabilizer-mixtures based on LS 1, LS 2 or LS 3 or of UV-absorbers like UV 1 or UV 2.

By using blue-pigmented test specimen, additionally 2 parts of a masterbatch called ®Remafin-Blue containing 4.1% Pigment Blue and 2.8% $TiO_2$ (rutile-type) has been added.

The additives have been dissolved in acetone in the presence of the polymer and the solvent has been afterwards evaporated in the vacuum.

Homogenization was carried out using a single screw extruder (type Brabender, screw-diameter 16 mm, L/D=20) at T=210–240° C./125 rpm . By addition of the pigment-masterbatch another 3fold extrusion under the same conditions took place.

The manufacture of the test-samples was carried out by punching objects from pressed plaques (300×300 mm, thickness 1 mm) which itself have been produced using a steam-heated/water-cooled hydraulic press at T=185° C.; contact pressure 30 bar for 5 min.; final pressure 200 bar for 3 min.

Test Procedure

Hot water storage of the samples was carried out for 2 months at T=90° C.

Artificial weathering took place applying the Xenotest Beta according to DIN ISO 4892-2 (black standard temperature: 65° C., energy-density 60 W/m² (λ=300–400 nm), rain-cycle 18/102; filter: Xenochrome 300)

The Oxidation Induction Time (OIT) was carried out at T=200° C. using a heating rate of 20 K/min. under oxygen-flow (60 ml/min.).

OIT-results for blue pigmented water pipes are listed in tables 1A and 1B:

TABLE 1A

Set 1A: 0.1 part AO 2 + 0.1 part tris(2,4-di-tert.butylphenyl)phosphite + 0.1 part Ca-stearate + 0.082 part P.B (15:1) (pigment-system) + 0.05 part titaniumdioxide

| UV-/Heatstabilizer(s) | OIT/min. | |
|---|---|---|
| | before/ | after water-treatment |
| comparative (no HAS) | 32 | 5 |
| 0.2 part LS 1 | 41 | 17 |
| 0.1 part LS 2; 0.1 part LS 3 | 48 | 4 |
| 0.3 part LS 1 | 53 | 22 |
| 0.3 part UV 1 | 28 | 3 |
| 0.15 part LS 1; 0.15 part LS 2 | 56 | 4 |
| 0.2 part LS 2; 0.1 part UV 1 | 52 | 3 |
| 0.1 part LS 3; 0.1 part LS 2; 0.1 part UV 1 | 42 | 3 |

TABLE 1B

Set 1B: 0.1 part AO 1 + 0.1 part tris(2,4-di-tert.butylphenyl)phosphite + 0.1 part Ca-stearate + 0.082 part P.B (15:1)(pigment-system) + 0.05 part titaniumdioxide

| UV-/Heatstabilizer(s) | OIT/min. | |
|---|---|---|
| | before/ | after water-treatment |
| 0.2 part LS 1 | 37 | 17 |
| 0.1 part LS 3; 0.1 part LS 2 | 41 | 10 |
| 0.3 part LS 1 | 43 | 14 |
| 0.2 part LS 1; 0.1 part UV 2 | 45 | 18 |
| 0.2 part LS 1; 0.1 part UV 1 | 48 | 16 |
| 0.3 part UV 1 | 32 | 4 |
| 0.2 part LS 2; 0.1 part UV 1 | 36 | 8 |
| 0.1 part LS 3; 0.1 part LS 2; 0.1 part UV 1 | 50 | 9 |

TABLE 1C

Set 1C: phenol: 0.05 part AO 1 + 0.05 part AO 2 + 0.1 part tris(2,4-di-tert.butylphenyl)phosphite + 0.1 part Ca-stearate + 0.082 part P.B (15:1)(pigment-system) + 0.05 part titaniumdioxide

| UV-/Heatstabilizers | OIT/min. | |
|---|---|---|
| | before/ | after water-treatment |
| comparative (no HAS) | 58 | 18 |
| 0.2 part LS 1 | 69 | 41 |
| 0.15 part LS 3; 0.15 part LS 2 | 78 | 17 |
| 0.3 part LS 1 | 78 | 47 |
| 0.2 part LS 1; 0.1 part UV 2 | 68 | 39 |
| 0.2 part LS 1; 0.1 part UV 1 | 56 | 38 |
| 0.3 part UV 1 | 40 | 4 |
| 0.2 part LS 2; 0.1 part UV 1 | 80 | 10 |

The experimental data clearly show the surprisingly superior stabilizing properties of the instant stabilizer compositions compared to the prior art.

What is claimed is:

1. A stabilizer composition for thermoplastic polymers comprising:

a) at least one sterically hindered amine, wherein the at least one sterically hindered amine is the polymer of epichlorhydrin and 2,2,4,4-tetramethyl-7-oxa-3,20-diaza-20-(2,3-epoxi-propyl)-dispiro-[5.1.11.2]-heneicosane-21-one (LS 1); and b) at least one phenolic antioxidant, wherein the overall weight ratio of component(s) a) to the overall weight ratio of component(s) b) is from 10:1 to 1:5.

2. A stabilizer composition as claimed in claim 1, wherein component b) is selected from the group consisting of bis-[3,3-bis-(4'-hydroxy-3'-tert.butylphenyl)-butanoic acid]-glycolester (AO 1), tetrakismethylene(3,5-di-tert.butyl-4-hydroxyphenyl)-hydrocinnamate (AO 2), octadecyl-3-(3,5-di-tert.butyl-4-hydroxyphenyl)-propionate (AO 3), 4,4',4"-[(2,4,6-trimethyl-1,3,5-benzenetriyl)tris(methylene)]-tris[2,6-bis(1,1-dimethylethyl)phenol] (AO 4), 1,3,5-triazine-2,4,6(1H,3H,5H)-trione, 1,3,5-tris[[4-(1,1-dimethylethyl)-3-hydroxy-2,6-dimethylphenyl]methyl] (AO 5), phenol, 4,4',4"-(1-methyl-1-propanyl-3-ylidene)tris[2-(1,1-dimethylethyl)-5-methyl (AO 6), phenol, 2,6-bis[[3-(1,1-dimethylethyl)-2-hydroxy-5-methylphenyl]octahydro-4,7-methano-1H-indenyl]-4-methyl (AO 7), and benzenepropanoic acid, 3-(1,1-dimethylethyl)-4-hydroxy-5-methyl-, 2,4,8,10-tetraoxa-spiro[5.5]undecane-3,9-diylbis (2,2-dimethyl-2,1-ethanediyl) ester (AO 8).

3. A stabilizer composition as claimed in claim 2, wherein component b) is compound (AO 1), (AO 2) or (AO 3) or any mixture thereof.

4. A stabilizer composition as claimed in claim 3, wherein component b) is a mixture of compound (AO 1) and (AO 2) in a weight ratio of 2:1 to 1:2.

5. A stabilizer composition as claimed in any of claims 1 to 4, wherein an additional UV-absorber as component c) is selected from the group consisting of methanone, [2-hydroxy-4-(octyloxy)phenyl]phenyl (UV 1), phenol, 2-(5-chloro-2H-benzotriazol-2-yl)-6-(1,1-dimethylethyl)-4-methyl (UV 2), a 2-hydroxybenzophenone, a 2-(2-hydroxyphenyl)-benzotriazole, a 2-(2-hydroxyphenyl)-1,3,5-benzotriazine, an oxanilide, a cinnamate and a salicylate, and wherein the weight ratio of component(s) a): component(s) b): component(s) c) is from 5:1:1 to 1:5:5.

6. A thormoplastic polymer comprising the stabilizer composition as claimed in claim 1, wherein the stabilizer composition is present in an amount of 0.001 to 2.000% by weight, based on the polymer.

7. A thermoplastic polymer comprising the stabilizer composition as claimed in claim 1, wherein the stabilizer composition is present in an amount of 0.020 to 0.20% by weight, based on the polymer.

8. The thermoplastic polymer as claimed in claim 6, wherein the thermoplastic polymer is polyethylene.

9. A process of stabilizing thermoplastic polymers for long contact with water comprising incorporating therein before or during processing a stabilizing quantity of the stabilizer composition according to claim 1.

10. A process according to claim 9 wherein the stabilizer composition is added to an amount of 0.020 to 0.20% by weight, based on the thermoplastic polymer.

11. The stabilizer composition according to claim 1, wherein said at least one sterically hindered amine further comprises a compound selected from the group consisting of poly-[[6[1,1,3,3-tetramethylbutyl)-imino]-1,3,5-triazine-2,4-diyl][2-(2,2,6,6-tetramethyl-piperidyl)-amino]-hexamethylene-[4-(2,2,6,6-tetramethylpiperidyl)iminol) (LS 2). and poly-(N-hydroxyethyl-2,2,6,6-tetramethyl-4-hydroxy-piperidyl-succinate) (LS 3).

12. A thermoplastic polymer comprising the stabilizer composition as claimed in claim 1.

13. The thermoplastic polymer as claimed in claim 12, wherein the thermoplastic polymer is polyethylene.

* * * * *